United States Patent [19]
Hazell et al.

[11] Patent Number: 5,739,232
[45] Date of Patent: Apr. 14, 1998

[54] WATER BASED COMPOSITIONS WITH IMPROVED SUBSTRATE ADHESION

[75] Inventors: Thomas W. Hazell; Walter Nagel; C. Richard Costin; Gary W. Ceska, all of West Chester, Pa.

[73] Assignee: Sartomer Company, Exton, Pa.

[21] Appl. No.: 509,967

[22] Filed: Aug. 1, 1995

Related U.S. Application Data

[63] Continuation of Ser. No. 206,434, Mar. 4, 1994, abandoned.

[51] Int. Cl.$^6$ .................................................. C08F 30/04
[52] U.S. Cl. .................................................. 526/240
[58] Field of Search .......................... 526/240; 524/458

[56] References Cited

U.S. PATENT DOCUMENTS

| | | |
|---|---|---|
| 3,740,366 | 6/1973 | Sanderson et al. . |
| 4,090,844 | 5/1978 | Rowland . |
| 4,314,044 | 2/1982 | Hughes et al. . |
| 4,486,489 | 12/1984 | George ............................ 524/555 |
| 4,692,491 | 9/1987 | Ranka et al. ...................... 524/458 |
| 4,769,427 | 9/1988 | Nowakowsky et al. .............. 526/64 |
| 4,900,774 | 2/1990 | Mitsuji et al. . |
| 4,988,753 | 1/1991 | Rullmann et al. . |
| 5,036,122 | 7/1991 | Averbach et al. . |
| 5,093,396 | 3/1992 | Calhoun et al. .................. 524/458 |
| 5,191,009 | 3/1993 | Chen et al. ...................... 524/458 |
| 5,264,467 | 11/1993 | Distefano . |
| 5,281,638 | 1/1994 | Mowrey . |
| 5,344,867 | 9/1994 | Morgan et al. .................... 524/458 |
| 5,461,103 | 10/1995 | Bafford et al. .................... 524/458 |
| B1 4,692,491 | 10/1990 | Ranka et al. ...................... 524/458 |

FOREIGN PATENT DOCUMENTS

| | | | |
|---|---|---|---|
| 570459 | 2/1959 | Canada ............................ 526/240 |
| 0188381 | 7/1986 | European Pat. Off. . |
| 0240253 | 10/1987 | European Pat. Off. ........... 524/458 |
| 0297051 | 12/1988 | European Pat. Off. . |
| 2459160 | 6/1976 | Germany ........................ 526/240 |
| 2825476 | 6/1978 | Germany . |
| 48-32985 | 5/1973 | Japan ............................ 524/458 |
| 53-80431 | 7/1978 | Japan ............................ 524/458 |
| 57-67647 | 4/1982 | Japan ............................ 524/458 |
| 61-45255 | 3/1986 | Japan . |
| 62-265317 | 11/1987 | Japan ............................ 526/240 |
| 4-41512 | 2/1992 | Japan ............................ 524/458 |
| 648001 | 12/1950 | United Kingdom .............. 526/240 |
| 838943 | 6/1960 | United Kingdom .............. 524/458 |

OTHER PUBLICATIONS

Official Gazette 1046 TMOG-2 Sep. 4, 1984.

*Primary Examiner*—Joseph L. Schofer
*Assistant Examiner*—N. Sarofim
*Attorney, Agent, or Firm*—Michael B. Fein

[57] ABSTRACT

Curable and cured water based compositions having improved substrate adhesion, methods for their preparation and uses are provided. The coating and adhesive compositions comprise a water soluble compound, a metal salt of an α, β-ethylenically unsaturated compound, and a cure initiator. The compositions of the present invention are useful as substrate coating and adhesive compositions.

29 Claims, No Drawings

WATER BASED COMPOSITIONS WITH IMPROVED SUBSTRATE ADHESION

This application is a continuation of application Ser. No. 08/206,434 filed on Mar. 4, 1994 now abandoned.

FIELD OF THE INVENTION

The present invention relates to water-based curable and cured compositions. In particular, the invention relates to curable and cured water-based compositions in which improved substrate adhesion is achieved by utilizing an $\alpha$, $\beta$-ethylenically unsaturated carboxylic acid as a crosslinking agent.

BACKGROUND OF THE INVENTION

Conventional compositions for coatings and adhesives typically utilize organic solvents to dissolve or disperse the reactive ingredients. The use of these organic solvents is environmentally disadvantageous due to the toxicity and polluting potential of the solvents. Further, use of organic solvents is economically disadvantageous because of the costs of the solvents. Thus, it is desirable to utilize water-based coating and adhesive compositions in which the use of organic solvents is eliminated.

Water-based coating and adhesive compositions have been developed. However, the adhesiveness of these compositions to substrates is diminished compared to the solvent-based compositions. Thus, a need exists for water-based coating and adhesive compositions which exhibit improved substrate adhesion.

SUMMARY OF THE INVENTION

The present invention provides curable and cured water-based coating and adhesive compositions, processes for their preparation, and processes for their use, the compositions having improved substrate adhesion. It has been discovered that improved substrate adhesion may be achieved in these compositions by incorporating a metal salt of an $\alpha$, $\beta$-ethylenically unsaturated carboxylic acid into a water soluble compound.

DESCRIPTION OF THE PREFERRED EMBODIMENTS

The term "substrate", as used herein, is intended to include metals, glass, rubbers or elastomers, plastics, polyesters, polyamides, polyacetals, and woven fabrics made of glass fibers or natural or synthetic organic fibers.

The term "water soluble compound", as used herein, is intended to include any water soluble or water dispersible monomer, oligomer, polymer, or mixtures thereof which may be used as a substrate coating or adhesive. Such compounds typically contain some functionality, i.e., hydroxyl group, carboxyl group, or the like, which renders the compounds water soluble or dispersible. Additionally, these compounds are characterized in that the compounds contain some functionality, such as a double bond or easily abstractible hydrogen or other atom, that render the compounds suitable for crosslinking.

Any water soluble or water dispersible monomer, oligomer, polymer, or mixtures thereof having the aforedescribed characteristics may be utilized as the water soluble compound in the compositions and methods of the present invention. It will be evident to one of ordinary skill in the art that any of the wide variety of known water soluble and water dispersible monomers, oligomers, polymers, and mixtures thereof as described in texts, publications, and patents directed to coatings and adhesives may be utilized in the compositions and methods of the present invention.

The monomers, and oligomers thereof, which may be utilized in the present invention include those water soluble or water dispersible mono- and poly-functional monomers known in the art to be suitable for forming substrate coatings or adhesives. Illustrative of such monomers, without limitation, are monomers of (meth)acrylic acid and monoesters thereof, crotonic acid, maleic acid, iraconic acid and the like, aromatic vinyl monomers, nitrogen containing alkyl acrylates, amide compounds, vinyl compounds, nitrile compounds, and diene compounds.

Additional, water soluble or water dispersible monomers and oligomers known in the art to be suitable for use as substrate coatings or adhesives that may be utilized, include, without limitation, polyethylene glycol di(meth) acrylate, polypropylene glycol mono(meth) acrylate, highly alkoxylated triacrylates such as ethoxylated trimethylolpropane triacrylate, 2-ethoxyethyl methacrylate, 2-methoxyethyl acrylate, 2(2-ethoxyethoxy) ethylacrylate, acrylic water soluble oligomers, and the like.

Polymers which may be utilized in the present invention include polymers and mixtures thereof, including homopolymers and copolymers, of the known water soluble and water dispersible polymers suitable for forming substrate coatings. Illustrative polymers include, without limitation, cellulosic polymers such as alkyl celluloses and derivatives thereof, vinyl polymers such as polyvinyl alcohol, partially hydrolyzed polyvinyl acetate, and polyvinylpyrrolidone, acrylic polymers such as poly(meth)acrylates, polyacrylamides, and acrylic maleic anhydride copolymers, polyoxyolefins, and inorganic polymers.

Polymers useful in the compositions of the present invention for use as substrate adhesives include many of those above-listed for coatings. Additionally useful as substrate adhesive polymers, copolymers, and mixtures thereof include, without limitation, polyvinyl formal, polyvinyl acetate, chlorinated polyvinyl chloride, copolymers of vinyl acetate and vinyl chloride, copolymers of vinyl acetate and ethylene, copolymers of (meth)acrylic acid with ethylene and with conjugated dienes and posthalogenated products thereof, chlorosulfonated polyethylenes, brominated poly(2, 3-dichloro-1,3-butadiene), copolymers of alpha-chloroacrylonitrile with 2,3-dichloro-1,3-butadiene, copolymers of alpha-bromoacrylonitrile with 2,3-dichloro-1,3-butadiene, copolymers of vinylpyridine and conjugated dienes, rubbers of natural rubber, polystyrene, neoprene, styrene-butadiene, polyvinylchloride and the like, as well as halogen containing rubbers such as polychloroprene, chlorinated polychloroprene, natural rubber, polybutadiene, polyethylene and the like, chlorinated ethylene propylene heteropolymer with other dienes, chlorinated butadiene-styrene copolymers, and lattices of natural rubber, neoprene, styrene-butadiene rubber, nitrile-butadiene rubber, carboxylated nitrile-butadiene rubber, and the like.

The above described monomers, oligomers, and polymers are commercially available. Preferred monomers and oligomers are the highly alkoxylated triacrylates and acrylic water soluble oligomers. Preferred polymers are polyvinyl acetate and rubber lattices.

The present invention is based on the discovery that a metal salt of an $\alpha$, $\beta$-ethylenically unsaturated carboxylic acid can be advantageously employed in compositions containing the aforedescribed water soluble compounds to produce compositions which exhibit improved substrate adhesion. Specifically, it has been discovered that the use of metal salts of acrylic and methacrylic acids in the compositions and methods of the present invention to promote crosslinking resulted in improved adhesion of the composition to substrates. Thus, the compositions and methods of the present invention are those in which organic solvents are eliminated, but which compositions exhibit improved adhesiveness to substrates compared to conventional water-based coating and adhesive compositions.

The metal component of the acrylic or methacrylic acid metal salt useful in the present invention may be aluminum, antimony, barium, cadmium, calcium, iron, lead, magnesium, mercury, molybdenum, nickel, potassium, silver, titanium, and zinc. The preferred metal is zinc. The preferred metal salt is zinc diacrylate.

The metal salt may be incorporated into the water soluble compound by admixing the water soluble compound and the metal salt of the (meth)acrylic acid obtained by reacting the metal compound and the acid. Alternatively, the acrylic or methacrylic acid and the metal compound, i.e., metal oxide, metal hydroxide, metal carbonate, and the like, may be admixed into the water soluble compound and reacted to form metal salts in situ.

The amount of metal salt to be used in the compositions and methods of the present invention should be an amount effective to yield an improvement in adhesion of the composition to the substrate. Generally, the amount to be used should be an amount from about 0.1 parts to about 40 parts per 100 parts of the water soluble compound. Preferably, amounts of from about 1.0 parts to about 30 parts are used.

Curing may be initiated by the addition of a suitable water soluble initiator. Any of a variety of the well known water soluble initiators may be utilized. Examples of such initiators include water soluble hydroperoxides such as tertiary alkyl hydroperoxides. Exemplary tertiary alkyl hydroperoxides include, without limitation, 2-5-dihydroperoxy-2,5-dimethylhexane, tertiary butyl hydroperoxide, tertiary amyl hydroperoxide, and cumene hydroperoxide.

Additional suitable initiators include the azo initiators. Illustrative azo initiators useful in the present invention include, without limitation, 2,2'-azobis(2-amidinopropane) dihydrochloride, 2,2'-azobis(4-methoxy-2,4-dimethylvaleronitrile), 4,4'-azobis(4-cyanovaleric acid), 2,2'-azobis(methyl isobutyrate), 2,2'-azobis(N,N'-dimethylene isobutyramidine) dihydorchloride, 2,2'-azobis[2-2(2-imidazolin-2-yl)propane], 2,2'azobis[2-methyl-N-(2-hydroxyethyl)-propionamide], and 1,1'-azobis(cyclohexane-1-carbonitrile).

Further, suitable cure initiators include the redox initiators. Such initiators comprise a reducing agent, such as a sulfite or bisulfite of an alkali metal, ammonium sulfite or ammonium bisulfite, and an initiator, such as an alkali metal or ammonium persulfate or alkali metal or ammonium thiosulfate, in combination with the reducing agent. Alternatively, an alkali metal of persulfate or ammonium persulfate may be used alone as a curing initiator.

The curing initiators can be used singly or in any suitable combination. The amount of initiator used is an amount effective to initiate curing of the composition on exposure to heat. Generally, the amount of initiator utilized may be from about 1.0 parts to about 10 parts per 100 parts of the water soluble compound. Preferably, amounts of from about 2.0 parts to about 6.0 parts are used.

Curing may be carried out at a temperature from about 20° C. to about 350° C. Cure times will depend upon the water soluble compound and cure initiator selected. In general, cure times will range from a few minutes to several hours. Selection of the specific cure temperature and time will be predicated upon the water soluble compound, carboxylic acid metal salt, and cure initiator selected.

The coating compositions of the present invention may be prepared for application in any conventional manner by the addition of pigments, antioxidants, dispersing aids, stabilizers and others additives that may be desirable depending on the end use of the coating. The coatings prepared from the compositions of the present invention may be applied to the substrate by any conventional means such as dipping, spraying, roller coating or the like. The coating compositions may be utilized in a variety of settings such as paints, protective coatings, and the like.

Adhesive compositions of the present invention may contain additives such as fillers, extenders, coloring agents, dispersing agents, surfactants, film-forming agents, viscosity modifiers, and the like. The adhesives compositions may be applied to a surface of the substrates to be joined by any conventional means such as dipping, spraying, brushing, or the like. The adhesive composition is then dried at ambient temperatures or under forced drying conditions and bonding of the substrates accomplished at conditions of time, temperature, and pressure effective to achieve bonding. Alternatively, drying of the adhesive composition may be omitted. The adhesive coated substrate surfaces are preferably joined together under pressure. The adhesives may be utilized for metal to metal bonding as well as for rubber to metal bonding.

The invention will be clarified further by a consideration of the following examples, which are intended to be purely exemplary.

EXAMPLES

In the following tables, all of the ingredients are expressed in parts by weight, unless otherwise noted, and each column corresponds to a numbered example.

Example 1

30 g. of ethoxylated trimethylolpropane triacrylate and 0.5 g. cumene hydroperoxide were mixed in 15 g. water until dissolved at 40° C. The formulation was coated on two 0.032 inch thick cold-rolled steel adhesion panels previously washed with methanol and dried. The adhesion panels were overlapped one inch with a coating of 0.015 inch thickness between and placed in a 0.075 inch plaque mold, preheated to 320° F., and then cured in a press for twenty minutes after which they were removed and cooled for two hours. Lap shear adhesion was measured on a Thwing-Albert tensile tester in accordance with ASTM D 816 using a crosshead speed of one inch per minute and the results, which may be found on Table 1, were reported in pounds per square inch.

Examples 2-3

Coatings were produced and tested for examples 2 and 3 by repeating the procedures of Example 1, except that the formulations for Examples 2 and 3, which may be found on Table 1, were followed.

Example 2 involved the addition of 3 g. zinc diacrylate to the formulation. The zinc diacrylate was added to the water, warmed to 40° C., and mixed until dissolved. The remaining ingredients were then added and mixed until dissolved.

Example 3 used the formulation of Example 2 except that 10 g. of zinc diacrylate were substituted for the 3 g. of zinc diacrylate of Example 2, and 20 g. of ethoxylated trimethylolpropane triacrylate were substituted for the 30 g. of ethoxylated trimethylolpropane triacrylate of Example 2.

TABLE 1

| EXAMPLE | 1 | 2 | 3 |
|---|---|---|---|
| SR-9035[1] | 30 | 30 | 20 |
| zinc diacrylate | — | 3 | 10 |
| water | 15 | 15 | 15 |
| cumene hydroperoxide | 0.5 | 0.5 | 0.5 |
| cure time (minutes) | 20 | 20 | 20 |
| cure temperature (°F.) | 320 | 320 | 320 |
| lap shear adhesion (CRS; PSI) | 12 | 94 | 500 |
| % elastomer on CRS after failure | 0 | 65 | 90 |

[1]Ethoxylated trimethylolpropane trimethacrylate available as SR-9035 ™ from Sartomer Company, Inc., Exton, Pennsylvania.

The results illustrated in Table 1 demonstrate that, for those coatings in which zinc diacrylate was a part of the formulation, improved substrate adhesion was achieved.

Example 4

3 g. of polyvinyl acetate latex adhesive were applied to clean cold rolled steel adhesion panels. The adhesion panels were overlapped one inch with a 0.015 inch thickness of adhesive composition between, cured for 120 minutes at 203° F., and subsequently measured for lap shear adhesion. The results may be found on Table 2.

Examples 5–7

Adhesives were produced and tested for Examples 5–7 by repeating the procedures of Example 4 except that the formulation and cure times for Examples 5–7, which may be found on Table 2, were followed.

Example 5 involved the addition of 0.2 g. of zinc diacrylate and 0.2 g. of cumene hydroperoxide to the pollvinyl acetate latex of Example 4. The formulation was cured for eight minutes at 410° F.

Examples 6–7

The formulation of Example 5 was used for Examples 6 and 7. Example 6 was cured for seven minutes at 410° F. Example 7 was cured for six minutes at 410° F.

TABLE 2

| EXAMPLE | 4 | 5 | 6 | 7 |
|---|---|---|---|---|
| polyvinyl acetate latex[1] | 3 | 3 | 3 | 3 |
| zinc diacrylate | — | 0.2 | 0.2 | 0.2 |
| cumene hydroperoxide | — | 0.2 | 0.2 | 0.2 |
| cure time (minutes) | 120 | 8 | 7 | 6 |
| cure temperature (°F.) | 203 | 410 | 410 | 410 |
| lap shear adhesion (CRS; PSI) | 150 | 585 | 575 | 530 |
| % elastomer on CRS after failure | 100 | 100 | 100 | 100 |

[1]Available as Elmer's ™ Glue from Borden, Inc.

The results illustrated in Table 2 demonstrate that adhesiveness to the substrate improved in the formulations in which zinc diacrylate was utilized to cure the polyvinyl acetate latex.

Example 8

40 g. of CHEMLOK 607™, a commercial rubber to metal water-based adhesive, were applied to two clean cold rolled steel adhesion panels at a thickness of 0.005 inches and dried in an oven at 98° C. for 5 minutes. Subsequently, a stock of 100 g. of Tyrin 0136, 10 g. of magnesium oxide, 50 g. of carbon black, 2 g. of dicumyl peroxide, and 10.7 g. of a scorch retardant monomer was cured between the adhesion panels with a one inch overlap, at a thickness of 0.015 inch for 20 minutes inside of a 0.075 inch plaque mold. Lap shear adhesion was then measured on a tensile tester and reported on Table 3 as pounds per square inch.

Example 9

To 40 g. of CHEMLOK 607™ were mixed 0.1 g. VA-044™, an azo initiator, and 0.4 g. zinc diacrylate. The formulation was applied to adhesion panels, but not dried as in Example 8. The elastomer stock of Example 8 was subsequently cured between the adhesion panels, at a thickness of 0.015 inch, and tested as in Example 8.

TABLE 3

| EXAMPLE | 8 | 9 |
|---|---|---|
| CHEMLOK 607[1] | 40 | 40 |
| VA-044[2] | — | 0.1 |
| zinc diacrylate | — | 0.4 |
| Tyrin 0136[3] | 100 | 100 |
| magnesium oxide | 10 | 10 |
| N550 Black[4] | 50 | 50 |
| dicumyl peroxide[5] | 2 | 2 |
| SR-519[6] | 10.7 | 10.7 |
| lap shear adhesion (CRS; PSI) | 880 | 1050 |
| % elastomer adhered to CRS after failure | 0 | 15 |

[1]A mixture of synthetic organic silicones in methanol solvent available from Lord Corporation, Erie, Pennsylvania.
[2]2,2' azobis(N,N'-dimethylene isobutyramidine)dihydrochloride available from WAKO Chemicals USA, Inc., Richmond, Virginia.
[3]Chlorinated polyethylene obtained from Dow Chemical Company, Midland, Michigan.
[4]Carbon black available from Harwick Chemical Corporation, Akron, Ohio.
[5]Dicumyl peroxide 40 KE available from Harwick.
[6]Trifunctional scorch retardant monomer available from Sartomer.

The results illustrated in Table 3 demonstrate that improved substrate adhesion was obtained in a commercial water-based rubber to metal adhesive when zinc diacrylate was used a crosslinking agent in the formulation.

Example 10

A 0.015 inch coating of an acrylic oligomer diluted with 50% water was applied to MYLAR™, SURLYN™, glass, and cold rolled steel and heated in an air circulating oven at 100° C. for 10 minutes. The substrates were subsequently examined for oligomer adhesion and the results reported in Table 5.

Example 11

2.5 g. of an acrylic oligomer were mixed with 0.1 g. azo initiator in 2.5 g. of water. The formulation was applied at a thickness of 0.015 inch to the substrates of Example 10, dried and examined as in Example 10.

Example 12

The formulation of Example 11 was used except that 0.2 g. zinc diacrylate was added to the formulation. The formulation was applied at a thickness of 0.015 inch, dried, and examined as in Example 11.

TABLE 4

| EXAMPLE | 10 | 11 | 12 |
|---|---|---|---|
| CN455W50[1] | 100% | — | — |
| CN455[2] | — | 2.5 | 2.5 |
| water | — | 2.5 | 2.5 |
| zinc diacrylate | — | — | 0.2 |
| WAKO V50[3] | — | 0.1 | 0.1 |
| Mylar ™[4] adhesion | peel off | peel off | no peel |
| Surlyn ™[5] adhesion | peel off | some peel | little peel |
| Glass adhesion | peel off | peel off | little peel |
| CRS adhesion | cracked | cracked | some adhesion |

[1]Water soluble acrylic oligomer diluted with 50% water available from Cray Valley, Verneuil, en Halatte, France.
[2]Water soluble acrylic oligomer, undiluted, available from Cray Valley.
[3]2,2' azobis(2-amidinopropane)dihydrochloride, available from WAKO Chemicals.
[4]Polyethylene terephthalate film available from E. I. DuPont DeNemours & Company, Wilmington, Delaware.
[5]Ionomer resin available as Surlyn ™ 9910 from DuPont.

Table 4 demonstrates that oligomer adhesion to the various substrates improved with the addition of zinc diacrylate.

Example 13

A styrene-butadiene latex was coated on cold rolled steel adhesion panels. The panels were overlapped one inch with the latex, at a thickness of 0.015 inch, between and cured for 60 minutes at 160° F. The panels were tested for lap shear adhesion and the results reported on Table 5.

Example 14

38 g. of SBR latex, 0.5 g. zinc diacrylate, and 1 g. cumene hydroperoxide were mixed and applied to cold rolled steel panels. The panels were overlapped one inch with a coating thickness of 0.015 inch and cured for 10 minutes at 160° F. and the results were reported on Table 5.

TABLE 5

| EXAMPLE | 13 | 14 |
|---|---|---|
| SBR latex[1] | 100% | 38 |
| zinc diacrylate | — | 0.5 |
| cumene hydroperoxide | — | 0.1 |
| cure temperature (°F.) | 160 | 160 |
| cure time (minutes) | 60 | 10 |
| lap shear adhesion (CRS; PSI) | 0 | 100 |

[1]Bondex ™ SBR latex obtained from RPM Bondex International, St. Louis, Missouri.

Table 5 demonstrates that the addition of zinc diacrylate to the SBR latex formulation resulted in improved substrate adhesion.

Other embodiments of this invention will be apparent to those skilled in the art from a consideration of this specification or practice of the invention disclosed herein. It is intended that the specification and examples be considered as exemplary only with the true scope and spirit of the invention being indicated in the following claims.

What is claimed is:

1. A curable composition having improved substrate adhesion, comprising:

a. a water soluble compound suitable for use as a substrate adhesive selected from the group consisting of acrylic oilgomer, and;

b. acid in an amount effective to promote cross-linking resulting in improved adhesion to substrates; and c. a cure initiating effective amount of a cure initiator.

2. The curable composition of claim 1, wherein the compound is a rubber to metal adhesive.

3. The curable composition of claim 1, wherein the compound is a highly alkoxylated triacrylate.

4. The curable composition of claim 3, wherein the highly alkoxylated triacrylate is ethoxylated trimethylolpropane triacrylate.

5. The curable composition of claim 1, wherein the compound is a water soluble acrylic oligomer.

6. The curable composition of claim 1, wherein the compound is polyvinyl acetate latex.

7. The curable composition of claim 1, wherein the compound is a rubber lattice.

8. The curable composition of claim 7, wherein the rubber lattice is styrene-butadiene latex.

9. The curable composition of claim 1, wherein the metal salt of the α, β-ethylenically unsaturated carboxylic acid is a metal salt of acrylic acid.

10. The curable composition of claim 9, wherein the metal salt of acrylic acid is zinc diacrylate.

11. The curable composition of claim 1, wherein the metal salt of the α, β-ethylenically unsaturated carboxylic acid is present in an amount from about 0.1 to about 40 parts per 100 parts of the water soluble compound.

12. The curable composition of claim 10, wherein the zinc diacrylate is present in an amount of from about 0.1 to about 40 parts per 100 parts of the compound.

13. The curable composition of claim 10, wherein the zinc diacrylate is present in an amount from about 1.0 to about 30 parts per 100 parts of the compound.

14. The curable composition of claim 1, wherein the cure initiator is a water soluble hydroperoxide, an azo initiator, a redox initiator, or mixtures thereof.

15. The curable composition of claim 14, wherein the polymerization initiator is present in an amount from about 1.0 to about 10 parts per 100 parts of the compound.

16. A curable composition, comprising (a) a water soluble or water dispersible compound suitable for use as a substrate adhesive selected from the group consisting of acrylic monomers, oligomers, and polymers;

(b) zinc diacrylate in an amount of about 0.1 to about 40 parts per 100 parts of the water soluble compound; and (c) a cure initiator selected from the group consisting of water soluble hydro peroxide, azo initiator, and redox initiator present in an amount from about 1.0 to about 10 parts per 100 parts of the water soluble compound.

17. The curable composition of claim 16, wherein the zinc diacrylate is present in an amount of about 1.0 to about 30 parts per 100 of the compound.

18. The curable composition of claim 16, wherein the compound is a rubber to metal adhesive.

19. The curable composition of claim 3, wherein the highly alkoxylated triacrylate is ethoxylated trimethymethylolpropane triacrylate.

20. The curable composition of claim 19, wherein the highly alkoxylated triacrylate is ethoxylated trimethylolpropane triacrylate.

21. The curable composition of claim 16, wherein the compound is a water soluble acrylic oligomer.

22. The curable composition of claim 16, wherein the compound is a polyvinyl acetate latex.

23. The curable composition of claim 16, wherein the compound is a rubber lattice.

24. The curable composition of claim 23, wherein the rubber lattice is styrene-butadiene latex.

25. A method for providing a curable composition having improved substrate adhesion, comprising mixing a water soluble compound suitable for use as a substrate adhesive, a metal salt of acid in an amount effective to promote crosslinking resulting in improved adhesion to substrates, and a cure initiating effective mount of a cure initiator.

26. The method of claim 25, wherein the metal salt of acrylic or methacrylic acid is present in an amount from about 0.1 to about 40 parts per 100 parts of the compound and the cure initiator is present in an amount from about 1.0 to about 10 parts per 100 parts of the water soluble compound.

27. The method of claim 25, wherein the metal salt of the α, β-ethylenically unsaturated carboxylic acid is formed in situ.

28. The method of claim 25, wherein the metal salt of the α, β-ethylenically unsaturated carboxylic acid is a metal salt of acrylic acid.

29. The method of claim 28, wherein the metal salt of acrylic acid is zinc diacrylate.

* * * * *